United States Patent
Allen et al.

(10) Patent No.: US 7,261,490 B2
(45) Date of Patent: Aug. 28, 2007

(54) JET BLAST RESISTANT VEHICLE ARRESTING BLOCKS, BEDS AND METHODS

(75) Inventors: Glenn Allen, Aston, PA (US); Richard D. Angley, Aston, PA (US); John L. Gordon, Boothwyn, PA (US); Peter T. Mahal, Ardmore, PA (US); Silvia C. Valentini, West Chester, PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 0 days.

(21) Appl. No.: 11/253,333

(22) Filed: Oct. 19, 2005

(65) Prior Publication Data

US 2006/0034655 A1 Feb. 16, 2006

Related U.S. Application Data

(60) Continuation of application No. 10/755,163, filed on Jan. 9, 2004, now Pat. No. 6,971,817, which is a division of application No. 09/951,080, filed on Sep. 13, 2001, now Pat. No. 6,685,387.

(51) Int. Cl.
    *E01C 5/00* (2006.01)

(52) U.S. Cl. ............................ 404/34; 404/72; 188/376; 188/377

(58) Field of Classification Search .................. 404/6, 404/10, 17, 31, 34, 71, 72, 73; 244/110 E; 188/371, 376, 377

See application file for complete search history.

(56) References Cited

U.S. PATENT DOCUMENTS 2,380,105 A * 7/1945 Gerrard .................. 244/110 E
3,066,896 A * 12/1962 Schirtzinger ............ 244/114 R
3,572,465 A * 3/1971 Olson .......................... 188/377
3,867,159 A * 2/1975 Ergene ........................ 523/218
5,002,620 A * 3/1991 King .......................... 156/153
5,193,764 A * 3/1993 Larratt et al. ........... 244/110 R
5,620,276 A * 4/1997 Niemerski et al. ............. 404/6
5,789,681 A    8/1998 Angley et al.
5,885,025 A * 3/1999 Angley et al. ................ 404/27
5,902,068 A * 5/1999 Angley et al. ................ 404/34
6,174,587 B1 * 1/2001 Figge, Sr. ................... 428/178
6,183,835 B1 * 2/2001 Cho et al. .................... 428/113
6,257,802 B1 * 7/2001 Vosbikian ................ 405/259.3
6,685,387 B2   2/2004 Allen et al.
6,726,400 B1 * 4/2004 Angley et al. ................ 404/27
6,971,817 B2  12/2005 Allen et al.

* cited by examiner

*Primary Examiner*—Gary S. Hartmann
(74) *Attorney, Agent, or Firm*—Kilpatrick Stockton LLP

(57) ABSTRACT

Aircraft arresting beds constructed of cellular concrete at ends of runways may be subject to damaging effects of jet blast phenomena. Arresting units resistant to such effects and related methods are described. A block of compressible material, such as cellular concrete, provides compressive failure characteristics suitable for arresting travel of an aircraft overrunning a runway. Relatively thin frangible material positioned above the block provides a stronger, more damage resistant surface, while still readily fracturing in an arresting incident. Intermediate material, such as a foam layer, positioned under the frangible material may be included to provide a protective cushioning effect by mitigating transmission of external phenomena forces to the block. A fastening configuration at least partially enclosing other portions of the arresting unit provides a stable unified composite, without destroying desired compressive failure characteristics of the unit. Arresting units may also include a bottom layer of material stronger than the block of compressible material and a sealant coating with water resistant properties.

20 Claims, 3 Drawing Sheets

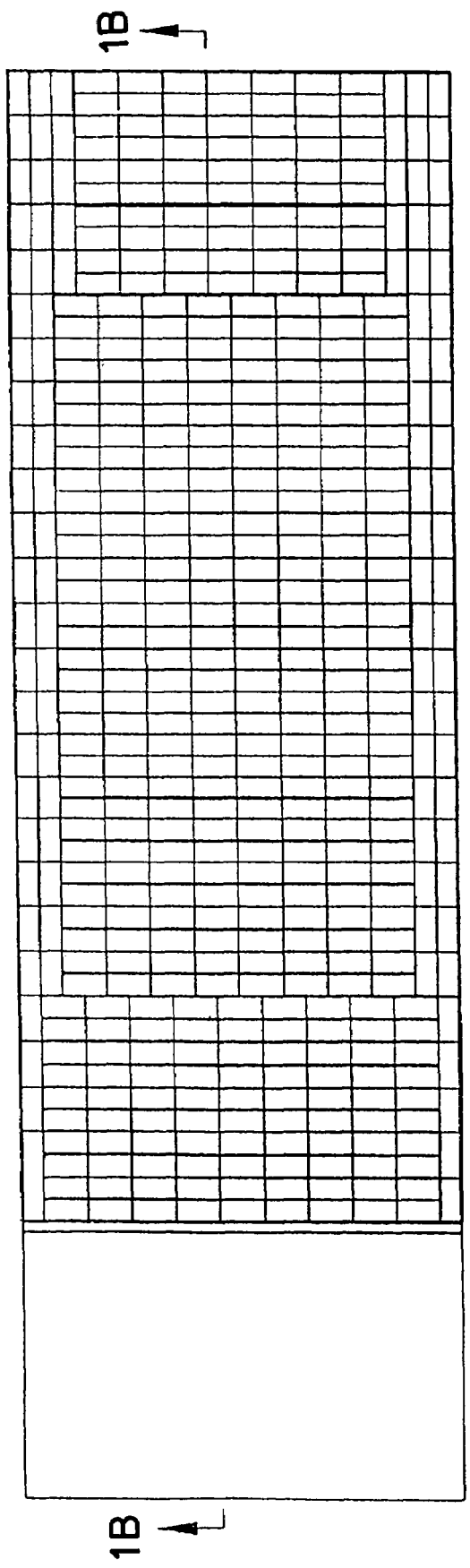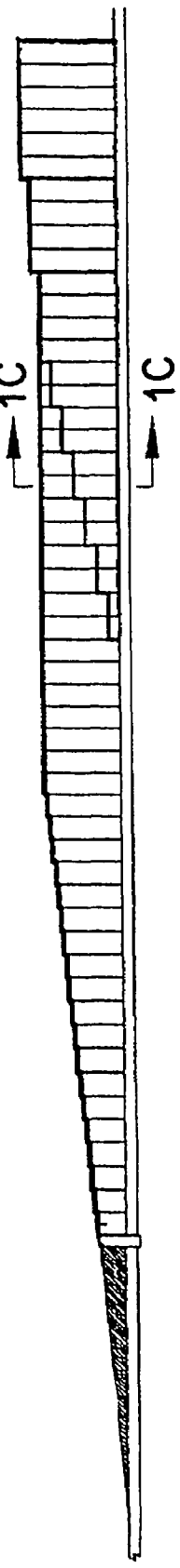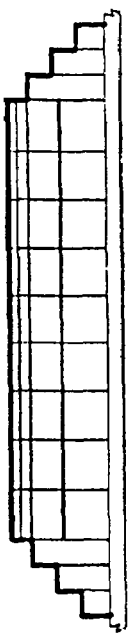
FIG. 1A PRIOR ART
FIG. 1B PRIOR ART
FIG. 1C PRIOR ART

JET BLAST RESISTANT VEHICLE ARRESTING BLOCKS, BEDS AND METHODS

RELATED APPLICATIONS

This application is a continuation application of prior application Ser. No. 10/755,163, filed Jan. 9, 2004, now U.S. Pat. No. 6,917,817, which is a divisional application of prior application Ser. No. 09/951,080, filed Sep. 13, 2001, now U.S. Pat. 6,685,387.

FEDERALLY SPONSORED RESEARCH (Not Applicable)

BACKGROUND OF THE INVENTION

This invention relates to arresting the forward motion of vehicles, such as aircraft overrunning a runway, and more particularly to arresting embodiments with improved resistance to jet blast and other potentially destructive forces.

The problem of aircraft overrunning the ends of runways, with the possibility of passenger injury and aircraft damage, is discussed in U.S. Pat. No. 5,885,025, "VEHICLE ARRESTING BED SYSTEMS" (which may be referred to as "the '025 patent"). That patent, together with U.S. Pat. No. 5,902,068, "VEHICLE ARRESTING UNIT FABRICATION METHOD" (the '068 patent) and U.S. Pat. No. 5,789,681, "ARRESTING MATERIAL TEST APPARATUS AND METHODS" (the '681 patent) describe arresting beds, units and fabrication methods, and testing based on application of cellular concrete for arresting purposes. The disclosures of the '025, '068 and '681 patents are hereby incorporated herein by reference.

By way of example, FIGS. 1A, 1B and 1C provide top, side and end views of a vehicle arresting bed constructed of cellular concrete blocks for installation at the end of an airport runway. As more fully described in the '025 patent, an overrunning aircraft enters the bed via a sloped ramp and encounters an array of cellular concrete blocks of increasing height and compressive gradient strength. Such compressive gradient strengths and the bed geometry are predetermined to enable forward travel to be arrested, while minimizing the potential for passenger injury and aircraft damage. In these figures, vertical dimensions and individual block size are expanded for clarity. An actual arresting bed may have dimensions of the order of 150 feet in width, with a maximum height or thickness of 30 inches, and include thousands of blocks of four foot by four foot or four foot by eight foot horizontal dimensions.

Arresting beds constructed pursuant to the above patents, with installations at major airports, have been shown to be effective in safely stopping aircraft under actual emergency overrun conditions. For example, the arresting of an overrunning airliner at JFK International Airport by an arresting bed fabricated by the assignee of the present invention, was reported in the *New York Times* of May 13, 1999. However, in some applications, depending in part upon particular airport layout, the proximity of jet blast or other physical forces may give rise to deteriorating or destructive effects which could limit the useful life of an arresting bed. Material such as cellular concrete, when used in an arresting bed, must have limited strength to permit compressive failure of the concrete without destruction of the landing gear of an aircraft, for example. Thus, the requirement to limit the strength of compressible material used for arresting purposes, in turn may make the material susceptible to damage or destruction by sonic, pressure, vibrational, lift, projected gravel and other characteristics and effects of jet blast from nearby aircraft, as well as from other sources, such as objects, people or vehicles making contact with an arresting bed other than during actual arresting incidents. As to jet blast phenomena in particular, measured conditions at an end-of-runway arresting bed installation site have included wind velocities to 176 MPH and 150 dB or higher sonic levels.

Accordingly, objects of the present invention are to provide new and improved arresting blocks and beds, and methods relating thereto, which may have one or more of the following characteristics and capabilities:

predetermined performance during aircraft arrestment;

improved resistance to some or all jet blast phenomena;

improved resistance to damage from pedestrian and maintenance vehicle traffic;

improved durability in installations in close proximity to aircraft operations;

improved resistance to atmospheric conditions;

simplified installation and replacement; and improved resistance to damage during shipment and installation.

SUMMARY OF THE INVENTION

In accordance with the invention, a vehicle arresting unit may include a block of compressible material, frangible material positioned above the block, intermediate material positioned between the frangible material and the block to reduce transmission of effects of external phenomena (e.g., jet blast phenomena) and a fastening configuration to retain elements in position.

In particular applications, the block may be cellular concrete 6 to 30 inches thick, the top sheet may be cement board about one-quarter inch thick, the intermediate material may be polyethylene foam about one-quarter inch thick and the wrapping may be polyester net. Such a vehicle arresting unit may also include a bottom sheet of cement board and an overlying sealant material having a water resistant characteristic.

Also in accordance with the invention, a method of fabricating a vehicle arresting unit may include some or all of the following steps:

(a) providing a block of compressible material having top, bottom and side surfaces;

(b) positioning frangible material above the top surface;

(c) positioning intermediate material having a force transmission mitigation characteristic between the top surface and the frangible material; and (d) securing the frangible material and intermediate material to the block.

In particular applications, step (d) above may comprise at least partially enclosing the block, top sheet and intermediate material by a fastening configuration, such as a wrapping, and additional steps of adding a bottom protective sheet and applying sealant material to the unit may be included.

For a better understanding of the invention, together with other and further objects, reference is made to the accompanying drawings and the scope of the invention will be pointed out in the accompanying claims.

BRIEF DESCRIPTION OF THE DRAWINGS

FIGS. 1A, 1B and 1C are respectively a plan view, and longitudinal and transverse cross-sectional views, of a vehicle arresting bed.

DESCRIPTION OF THE INVENTION

Figure 2:
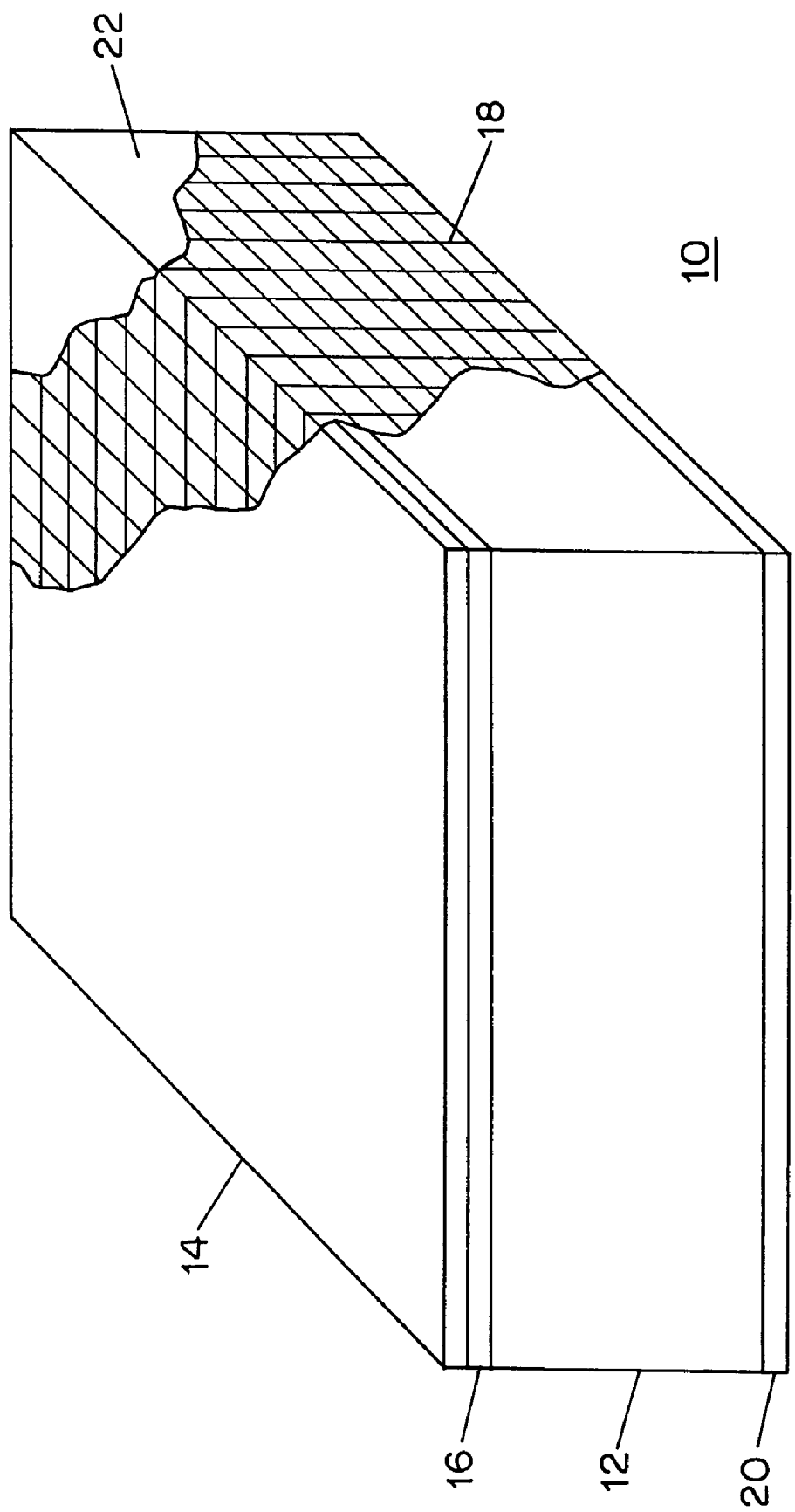
FIG. 2 is an orthographic view of a vehicle arresting unit in accordance with the invention.

FIG. 2 illustrates an embodiment of a vehicle arresting unit 10 pursuant to the invention. The drawing is not necessarily to scale and may represent an arresting unit of dimensions four feet by four feet by six to thirty inches thick, for example.

As shown, vehicle arresting unit 10 includes a block of compressible material 12, having top, bottom and side surfaces and a top to bottom thickness. Block 12 may be cellular concrete fabricated in accordance with the '068 patent or otherwise, or may be formed of phenolic foam, ceramic foam, or other suitable material. As described in the '025 patent, for aircraft arresting applications suitable arresting material characteristics are selected to enable aircraft travel to be arrested within a desired distance, without causing passenger injury or aircraft damage such as landing gear failure. For example, cellular concrete fabricated so as to provide a compressive gradient strength ranging between 60 to 80 psi (pounds per square inch) over a 66 to 80 percent penetration range has been found suitable for use in an arresting bed. Fabrication and testing of cellular concrete for such applications is described in the '068 and '681 patents.

Arresting unit 10 has a top sheet 14 of frangible material positioned above the top surface of unit 10 and nominally coextensive therewith. As will be further discussed, in installations in which an arresting bed is positioned in relatively close proximity to operating aircraft, jet blast phenomena and other external forces may have deleterious effects on compressible materials of strength suitable for arresting bed applications. Pursuant to the invention, top sheet 14 in combination with other elements of arresting unit 10 provides increased resistance to such effects.

In a currently preferred embodiment top sheet 14 may comprise a section of cement board of thickness of one-half inch or less. The thickness may, for example, fall within a nominal range of one-quarter to five-sixteenths inch. For present purposes, the term "cement board" is used to refer to a commercially available product, such as provided in sheet form under the trademarks "Durock" (of USG Corp.) and "Wonderboard" (of Custom Building Products Corp.). Also for present purposes, the term "nominal" or "nominally" is used to identify a value or dimension within plus or minus fifteen percent of a stated reference value, dimension or range. The word "frangible" is used in its ordinary dictionary sense of being breakable or shatterable without necessarily implying weakness or delicacy.

Arresting unit 10, in the illustrated embodiment, has intermediate material 16 positioned between top sheet 14 and the top surface of block 12. Intermediate material 16 may be a sheet or layer of foam material, such as closed-cell polyethylene foam, or other material selected for placement between top sheet 14 and the top surface of block 12. Intermediate material 16 may typically be pliable and may have compressible or resilient properties, or both, and is preferably equally breakable in both main dimensions. To reduce transmission of effects of external phenomena in the context of the combination of components comprising arresting unit 10, intermediate material 16 may be selected to provide a force transmission mitigation characteristic. Suitable material and thickness can be specified in particular applications in view of the nature and severity of applicable phenomena. For present purposes, the term "mitigation characteristic" is used consistent with the ordinary dictionary sense of "mitigate" of causing to become less harsh, hostile or severe, and may include one or more of spreading, dispersing, diluting, deflecting, dissipating, attenuating, cushioning, or generally lessening destructive effects on a surface or layer below material having a force transmission mitigation characteristic.

In a presently preferred embodiment employing a cellular concrete block and five-sixteenths inch thick cement board top sheet, one-quarter inch thick closed-cell polyethylene foam material is included for aircraft arresting bed applications. Such a foam sheet is thus considered to provide an adequate force mitigation characteristic suitable for a typical application. In other embodiments subject to different levels of external phenomena (e.g., higher or lower levels of jet blast phenomena) the intermediate material 16 may comprise other suitable material and may be thicker, thinner or may be omitted. Thus, in some applications the top sheet 14 may provide an adequate level of isolation of the block 12 from the external phenomena levels actually present, without inclusion of intermediate material 16.

Arresting unit 10 of FIG. 2 includes a wrapping 18 at least partially enclosing block 12, top sheet 14 and intermediate material 16. Wrapping 18 may be a fabric (e.g., a section of polyester net or other woven or non-woven material), a film (e.g., a perforated or solid, breathable or other plastic film or shrink wrap material), strapping or other suitable wrapping. While wrapping 18 is illustrated as being opaque, it may typically be basically transparent. As will be described, arresting unit 10 may also include a bottom layer 20 and wrapping 18 may partially or completely enclose all of elements 12, 14, 16 and 20 of unit 10. Wrapping 18 may bear or have applied to it an adhesive or adherent suitable to at least partially bond or hold wrapping 18 to some or all of the other components of unit 10. A suitable adhesive material may also be applied between the lower surface of wrapping 18 and a runway surface.

A basic function of wrapping 18 is to aid in maintaining structural integrity of unit 10 during non-emergency conditions, while being subject to tearing, breakage or other partial or complete disintegration during an arresting incident, so as not to interfere with desired compressive failure of unit 10 under arresting conditions. Consistent with this, a function of wrapping 18 is to facilitate adhesion of unit 10 to a runway or other surface, so as to both maintain integrity of the unit and its components, and also resist uplift forces associated with jet blast which may tend to displace unit 10. If the lower portion of wrapping 18 is adhered to a runway during installation, its upper portions will thus aid in resisting lifting forces affecting unit 10.

As noted, arresting unit 10 may have a bottom layer 20 positioned below the bottom surface of block 12 and nominally coextensive therewith. Layer 20 may comprise a sheet of cement board, a layer of cellular concrete of greater strength than block 12, or other suitable material. A basic function of layer 20 is to permit arresting unit 10 to be adhered to a runway extension or other surface to hold the unit 10 in a desired position. As such, layer 20 is desirably harder or stronger than the material of block 12, so that a greater surface to surface mounting or adherence capacity is provided without the potential for upper portions of block 12 to break away from a lower portion of block 12, if it were directly adhered to a surface of a runway extension. Thus, layer 20 is selected to provide an improved mounting or adherence capacity and, when held to the block 12 by wrapping 18, to thereby provide an improved mounting or adherence capability for the complete unit 10. Block 12 may be formed by pouring cellular concrete into a mold. For inclusion of layer 20, it may be placed in the bottom of such mold first and the block cast on top of it. Alternatively, layer 20 may be placed beneath a block of compressive material previously fabricated.

Arresting unit 10 may have a sealant material 22, with a water resistant characteristic, overlying part or all of wrapping 18. The sealant material, of polyurethane or other suitable material, may particularly be placed on the top of arresting unit 10 to provide additional protection from external phenomena associated with jet blast and other forces as well as from effects of weather. Alternatively, wrapping 18 may itself provide a water resistant characteristic or incorporate, or have applied to it before installation, a suitable sealant material.

Relevant external phenomena comprise jet blast phenomena, which may include sonic, vibrational, pressure, lift, erosive (e.g., by airborne gravel) and other characteristics and effects, as well as compressive and other forces resulting from persons, vehicles or objects making contact with an arresting bed other than during actual arresting incidents. Described components of the arresting unit 10 may be selected to reduce or mitigate effects of such external phenomena on block 12 (e.g., provide a level of protection to block 12 relative to external phenomena incident on top sheet 14) and thereby provide a force transmission mitigation characteristic as described above, to enhance arresting unit resistance to such phenomena. At the same time, the components and the composite arresting unit itself must not be so strong or force resistant as to subvert the basic required parameters of unit compression/failure with desired characteristics upon contact by the wheel of an aircraft overrunning a runway. Arresting units as described thus provide predetermined failure characteristics when arresting a vehicle, while providing improved resistance to deleterious effects of external phenomena in the absence of overrunning aircraft.

Figure 3:
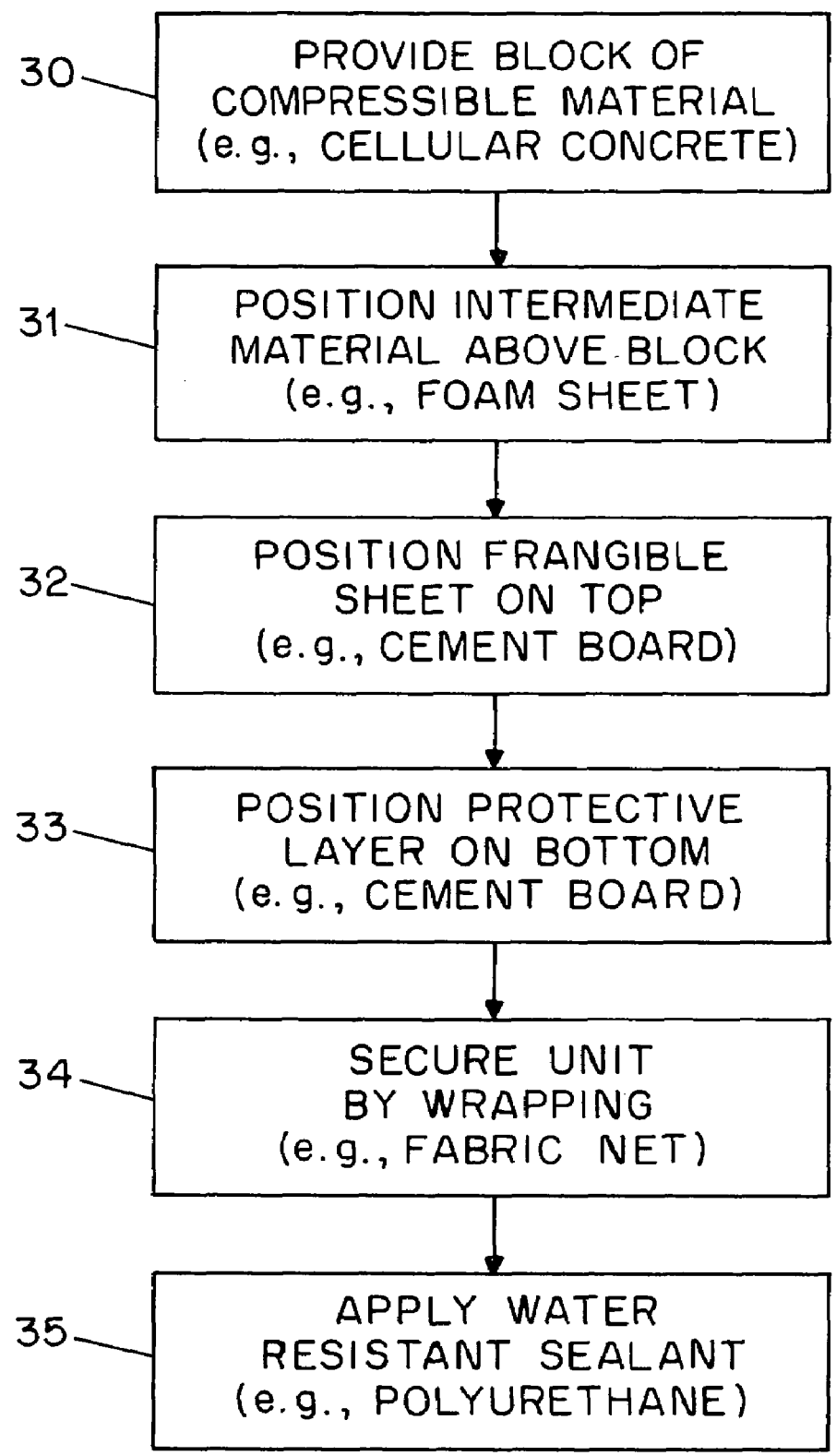
FIG. 3 is a flow chart useful in describing a method of fabricating a vehicle arresting unit in accordance with the invention.

FIG. 3 is a flow chart useful in describing a method utilizing the invention.

At 30, a block 12 of compressible material having characteristics appropriate for a vehicle arresting application is provided. As noted, the block may comprise cellular concrete having an appropriate compressive gradient strength as described in the '068 patent or other suitable material. For aircraft arresting bed applications the block may typically have dimensions of approximately four feet by four feet by six to 30 inches in thickness.

At 31, intermediate material 16 is positioned above the top surface of block 12. Intermediate material 16 may comprise a layer of closed-cell or other foam or other material providing a desired force transmission mitigation characteristic with respect to external phenomena. Such material may or may not have energy absorption properties, depending upon the particular material selected and may have a thickness up to one-half inch or more. In a currently preferred embodiment intermediate material 16 is provided in the form of a sheet of polyethylene foam of approximately one-quarter inch thickness. In some embodiments intermediate material 16 may be omitted (e.g., in view of the expected severity of external phenomena).

At 32, a top sheet 14 of frangible material is positioned above intermediate material 16. As discussed, top sheet 14 may comprise a section of cement board or other suitable material. Typically, if commercially available cement board is used for top sheet 14, it may have a thickness of up to about one-half inch, with a five-sixteenths inch thickness used in a currently preferred embodiment.

At 33, a bottom layer 20 is positioned below the bottom surface of block 12. As discussed, bottom layer 20 may comprise a section of cement board, a layer of cellular concrete of greater strength than block 12, or other suitable material. Bottom layer 20 is thus typically harder or stronger, or both, than the material of block 12, to provide added strength and stability in bonding or adhering the arresting unit to the surface of a runway extension and in preventing the net or strapping used for wrapping from being pulled upward into the block material during an arresting incident. In some applications bottom layer 20 may be omitted in view of overall arresting unit operational requirements.

At 34, top sheet 14 and intermediate material 16 are secured to block 12. As discussed, this may be accomplished by a wrapping 18 which at least partially encloses other components of the arresting unit 10. In a currently preferred embodiment, wrapping 18 comprises a section of polyester net constructed of 80 to 90 pound breaking strength strands, with net openings less than one-quarter inch square. In other embodiments fabric, plastic film, perforated shrink wrap, strapping or other suitable materials selected to provide adequate strength, with appropriate failure characteristics during an arresting incident, may be employed.

At 35, a sealant may be applied to the top of arresting unit 10, and to other surfaces as selected, to provide a water resistant characteristic. In a currently preferred embodiment, polyurethane with an epoxy undercoat is used for this purpose, however other suitable materials may be employed and may provide both water resistance and some degree of additional resistance to external phenomena, such as ultraviolet radiation.

With an understanding of the invention, it will be apparent that steps of the above method may be modified, varied as to order, omitted and supplemented by additional or different steps. Skilled persons will be enabled to select suitable materials and configurations as appropriate for particular applications and operating conditions. As noted, it may be desirable to glue or adhere the wrapping to the other components of the arresting unit. Also, in particular applications certain components may be omitted, varied or supplemented consistent with the invention.

While there have been described the currently preferred embodiments of the invention, those skilled in the art will recognize that other and further modifications may be made without departing from the invention and it is intended to claim all modifications and variations as fall within the scope of the invention.

The invention claimed is:

1. A method of fabricating a vehicle arresting unit for vehicle arrestment, comprising the steps of:
    (a) providing a block of compressible material having top, bottom and side surfaces, said block having compressive failure characteristics selected to decelerate a vehicle with deceleration limited to avoid vehicle damage during arrestment;
    (b) positioning intermediate material above said top surface, said intermediate material having a force transmission mitigation characteristic and comprising material different from the compressible material; and (c) positioning frangible material above said intermediate material, said frangible material fabricated to protect said block and intermediate material prior to vehicle arrestment and said frangible material having a breaking strength to readily break without subverting said compressive failure characteristics and comprising material different from the compressible material and the frangible material.

2. A method as in claim 1, additionally comprising the step of:
   (d) providing a fastening configuration arranged to retain said frangible material and intermediate material in position above said top surface.

3. A method as in claim 2, wherein step (d) comprises at least partially enclosing said block, intermediate material and frangible material.

4. A method as in claim 1, wherein step (a) comprises providing a block of cellular concrete.

5. A method as in claim 1, wherein step (b) comprises positioning a sheet of foam material.

6. A method as in claim 1, wherein step (c) comprises positioning frangible material comprising a portion of a sheet of frangible material of thickness not exceeding five-eighths of an inch.

7. A method of forming a vehicle arresting bed comprising:
   fabricating a plurality of vehicle arresting units in accordance with steps (a), (b) and (c) of claim 1; and
   (d) positioning said units to cover an area of width and length suitable to arrest travel of a vehicle entering the bed.

8. A method of fabricating a vehicle arresting unit for vehicle arrestment, comprising the steps of:
   (a) providing a block of compressible material having top, bottom and side surfaces, said block having compressive failure characteristics selected to decelerate a vehicle with deceleration limited to avoid vehicle damage during arrestment; and
   (b) positioning frangible material above said top surface, said frangible material fabricated to protect said block prior to vehicle arrestment and said frangible material having a breaking strength to readily break without subverting said compressive failure characteristics and comprising material different from the compressible material.

9. A method as in claim 8, additionally comprising the step of;
   (c) providing a fastening configuration arranged to retain said frangible material in position above said top surface.

10. A method as in claim 9, wherein step (c) comprises at least partially enclosing said block and frangible material.

11. A method as in claim 8, wherein step (a) comprises providing a block of cellular concrete.

12. A method as in claim 8, wherein step (b) comprises positioning frangible material comprising a portion of a sheet of frangible material of thickness not exceeding five-eighths of an inch.

13. A method of forming a vehicle arresting bed comprising:
   fabricating a plurality of vehicle arresting units in accordance with steps (a) and (b) of claim 8; and
   (c) positioning said units to cover an area of width and length suitable to arrest travel of a vehicle entering the bed.

14. A vehicle arresting unit, for vehicle arrestment, comprising:
   a block of compressible material having top, bottom and side surfaces, said block having compressive failure characteristics selected to decelerate a vehicle with deceleration limited to avoid vehicle damage during arrestment;
   frangible material positioned above said top surface, said frangible material fabricated to protect said block prior to vehicle arrestment and said frangible material having a breaking strength to readily break without subverting said compressive failure characteristics and comprising material different from the compressible material; and
   intermediate material positioned between said frangible material and said top surface, said intermediate material having a force transmission mitigation characteristic and comprising material different from the compressible material and the frangible material.

15. A vehicle arresting unit as in claim 14, wherein said intermediate material comprises a sheet of foam material.

16. A vehicle arresting unit as in claim 14, wherein said intermediate material comprises a sheet of material to mitigate transmission of forces incident upon said frangible material.

17. A vehicle arresting unit as in claim 14, wherein said frangible material comprises a portion of a sheet of frangible material of thickness not exceeding five-eighths of an inch.

18. A vehicle arresting unit as in claim 14, wherein said block of compressible material is a block of cellular concrete.

19. A vehicle arresting unit as in claim 14, additionally comprising:
   a fastening configuration arranged to retain said frangible material and said intermediate material in position above said top surface.

20. A vehicle arresting unit as in claim 14, additionally comprising:
   a fastening configuration at least partially enclosing said block, frangible material and intermediate material.

* * * * *